United States Patent [19]

Peeling

[11] 4,317,640

[45] Mar. 2, 1982

[54] FATIGUE AND CORROSION RESISTANT FLEXIBLE WIRE STRAND ASSEMBLY

[75] Inventor: Richard C. Peeling, Montoursville, Pa.

[73] Assignee: Bethlehem Steel Corporation, Bethlehem, Pa.

[21] Appl. No.: 157,699

[22] Filed: Jun. 9, 1980

[51] Int. Cl.³ .................. F16C 11/00; F16D 1/12
[52] U.S. Cl. ........................................ 403/36; 403/268
[58] Field of Search ............ 403/36, 15, 268, 270, 403/272, 406

[56] References Cited

U.S. PATENT DOCUMENTS

| 1,577,003 | 3/1926 | Sunderland | 403/272 X |
| 1,680,347 | 8/1928 | Sunderland | 403/272 X |
| 2,074,956 | 3/1937 | Carstarphen | 403/268 X |
| 3,507,949 | 4/1970 | Campbell | 403/268 |

*Primary Examiner*—Wayne L. Shedd
*Attorney, Agent, or Firm*—Joseph J. O'Keefe; Charles A. Wilkinson

[57] ABSTRACT

The end of a wire strand adjacent to a hot metal or resin type end fitting is relubricated after application of the fitting to the strand by injecting lubricant through a thin tube extending between the wires of the strand in the hot metal or resin portion of the fitting from the surface of the hot metal or resin to the neck of the fitting.

10 Claims, 3 Drawing Figures

FATIGUE AND CORROSION RESISTANT FLEXIBLE WIRE STRAND ASSEMBLY

BACKGROUND OF THE INVENTION

This invention relates to the application of end fittings to wire strand. More particularly the present invention relates to the application of lubricant to the area of the junction between the end of a poured socket attachment or end fitting and the wire strand after the application of the fitting to the strand.

There are three principal methods for applying a socket type end fitting to wire strand. In the first method the end fitting or socket is secured to the end of the strand by means of a solidified low melting socketing metal such as zinc or zinc alloy which is poured while in a molten condition into the bowl of the socket subsequent to insertion of the end of the strand into the socket. In the second method the end fitting is secured to the end of the strand by means of a solidified organic resin, for example, an epoxy resin material, which is poured while in a cool fluid condition into the bowl of the socket and cured with or without heat subsequent to insertion of the end of the strand into the socket. In the third method a deformable socket or end fitting is compressed upon the end of the wire strand by swaging or other mechanical compression.

Socketing by the use of hot metals such as zinc, zinc alloys or other low melting metal alloys or by the use of organic resin materials such as epoxy resins or the like are broadly referred to hereafter as socketing by the use of a solidified liquid. The socket used for either type of socketing, which socket may be the same whether a hot metal or an organic resin is used, is referred to broadly hereafter as a poured socket attachment or end fitting.

Some strand sockets are not suitable for resin socketing because it has been found that resin sockets should have a wedge shaped interior section to maintain the resin under compression when tension is applied to the strand. Consequently, if resin socketing is to be used for applying end fittings to wire strand, either a specially designed strand socket with a full internal wedge action or a wire rope socket may be used on the wire strand.

When using poured socket attachments or end fittings the end of the wire strand must prior to socketing be cleaned to remove all oil, dirt and grease from the component wires. The wires are then "broomed out", or separated in the bowl of the socket and the molten socketing metal or cool fluid organic resin socketing material is poured into the upended socket and allowed to solidify about the broomed out wires. If the wires were not initially cleaned to remove oil and grease the bond of the solidified socketing metal or solidified organic socketing resin with the wires would be adversely affected. Most of the oil and grease present on the wire strand comes from the strand lubricant. This lubricant normally lubricates the strand and prevents the component wires from binding and abrading against each other during use of the strand. Binding and abrading not only wears the wires away and increases fatigue but since most wire strand is comprised of either zinc or aluminum coated ferrous wires, or alternatively a new aluminum-zinc alloy coating only recently developed for use on wire, any abrasion between the wires tends to abrade away the coating exposing the underlying base metal to corrosion. It is thus very important that strand lubrication be maintained. Even if no corrosion resisting outer metal or other coating is provided on the component wires of the strand the normal strand lubricant tends to retard corrosion and if the strand lubricant is missing from the wires at any point there will tend to be additional corrosion at that point.

Strand lubricant is normally applied either during stranding of the wires together in the stranding die or sometimes shortly thereafter when additional lubricant is applied by passing the strand through a bath of lubricant. It is very difficult to apply the lubricant to the inner wires of the strand once the wires have been stranded together, however. Consequently, most, if not all, of the lubricant on the internal wires of the strand is applied as the wires enter the stranding die.

As previously stated, prior to hot metal socketing or cool fluid organic resin socketing of a wire strand, the strand lubricant must be removed from the portion of the wires of the strand which will be contacted by the hot metal or resin. This is usually accomplished by dipping or otherwise exposing the portion of the end of the strand which will be encased in the socket to a solvent for the lubricant. In order to make certain that lubricant does not touch the hot socketing metal causing burning and carbonation which might adversely affect either the strength of the wires of the strand, the bond of the socketing metal with the surface of the wires, or the protective metal coating on the wires the lubricant is cleaned from the strand for a short additional distance such as a centimeter or so beyond the point at which the hot metal is expected or calculated to contact the wires. The lubricant must also be removed from this short section to prevent lubricant from seeping back into the socket portion of the strand during hot metal socketing. Likewise, in order to assure a proper bond between organic socketing resin and the surface of the wires, or any protective metal coating on the wires, the lubricant is cleaned from the strand for a short additional section such as a centimeter or so beyond the point at which the resin is expected or calculated to contact the wires. The lubricant must also be removed from this short section to prevent lubricant from seeping back into the socket portion of the strand during the pouring of the liquid organic resin into the bowl of the socket.

After socketing is completed attempts are often made to relubricate the section of the strand near the neck or base of the socket, usually by squirting or otherwise applying lubricant to the exterior of this section. While the exterior wires of the strand can be effectively lubricated in this manner, it is extremely difficult, if not impossible, to reapply lubricant to the internal wires.

It is therefore an object of the present invention to provide a fatigue and corrosion resistant flexible linear assembly comprised of a wire strand with a poured socket attachment or end fitting with provision to lubricate the portion of the strand adjacent the end fitting in order to reduce fatigue and other failure of the strand during use.

SUMMARY OF THE INVENTION

The difficulties of the prior art in relubricating a wire strand adjacent to a poured socket attachment have been overcome by the present invention. In accordance with the invention the portion of a wire strand adjacent to a poured metal attachment socket is relubricated by injecting strand lubricant through a thin tube which is inserted between the wires of the strand before socketing in a position such that the tube extends during and after socketing from the surface of the solidified socketing liquid in the bowl of the socket through the body of solidified liquid and into the center portion of the strand on the other side of the body of solidified liquid at the neck or base of the socket. The tube must be smaller than the component wires of the strand so that the tube extends through the interstice between several adjacent wires. A lubricant fitting is preferably secured to the end of the tube which extends slightly above the top of the hot metal in the fitting. Lubricant is conveniently injected under pressure through this fitting into and through the tube and flows out of the other end of the tube into the interior of the wire strand adjacent to the neck of the socket or end fitting and as a result relubricates the portion of the strand from which the normal strand lubricant has been removed.

DESCRIPTION OF THE PREFERRED EMBODIMENT

Figure 1:
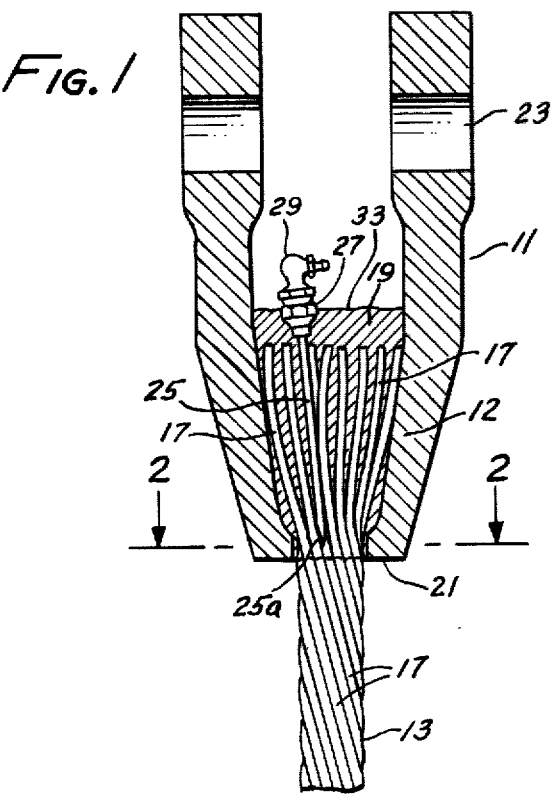
FIG. 1 is cross section of a poured socket attachment provided with the relubrication arrangement of the invention.

Wire strands provided with poured socket attachments or end fittings frequently fail at the junction between the fitting and the strand particularly when used on or in connection with vibrating machinery or the like. Since the junction between the strand and fitting is a point where the strand is particularly liable to bending stress as a result of the adjacent portion of the strand being held rigid in the solidified securing liquid such as a low melting metal or organic resin in the bowl of the socket, this juncture is a natural fatigue point. Consequently failure at the juncture has been considered to be due primarily to fatigue. The present inventor has, however, in investigations of such strands become aware that red rust forms between the interior wires of the strand just at the point at which lubricant is missing as a result of the cleaning operation carried out prior to socketing. The presence of red rust indicates that there is both corrosion and considerable abrasion at this juncture. (Abrasion is indicated because the normal protective metal coating on the individual wires must be at least partially removed before rusting of the ferrous substrate metal will normally occur, particularly if the protective metal coating on the wires is a galvanic coating.) Initial attempts to protect this juncture area of the strand by relubricating or by some other means were not successful. However, the present inventor ultimately discovered that relubrication can be attained by implanting a tube thinner than the component wires of the strand in the interstices between the wires in the socket during socketing and then injecting lubricant through a fitting on the end of the tube through the completed socket and into the center portion of the wire strand at the junction between the socket and the strand. The lubricant—usually a conventional wire rope and strand or other suitable lubricant—after being injected under pressure through the tube spreads from the end of the tube and seeps or flows gradually and evenly outwardly toward the surface of the strand evenly lubricating the wires and not only preventing corrosion of the wires but also very effectively preventing abrasion between the wires. It has been found that the use of a tube of greater diameter than the component wires of the strand or even of the same size as the individual wires is not satisfactory because the tube then interferes with the arrangement of the wires in the socket particularly where the wires pass through the neck of the socket. If the wires of the strand are disarranged at this point detrimental stresses are set up in the strand during working of the strand. Such stresses in themselves can cause excess abrasion and fatigue of the component wires. If the tube, however, is small enough to fit between the individual wires of the strand this difficulty does not occur and the portion of the strand next to the fitting can be easily lubricated with no interference with or stress upon the wires of the strand.

FIG. 1 is a section through a hot metal socket 11 applied to the end of a wire strand 13. The bowl 12 of the socket 11 has the individual wires 17 of the strand splayed or broomed out and immersed or confined in a solidified body of socketing metal 19 customarily used for socketing. It will be understood that while the socket 11 is shown filled with a solidified hot metal socketing material 19, the socket could just as well be filled with a suitable organic resin socketing material such as, for example, an epoxy resin. The wire strand 13 extends through the base 21 or neck of the socket. The upper portion of the socket may be provided with eyes 23 as shown or other arrangements for attaching the socket to the other structures. This type of socket is known as an "open" socket as opposed to a "closed" socket which would have only a single upward extension for securing to other structures. Either type may be a poured socket attachment.

Figure 3:
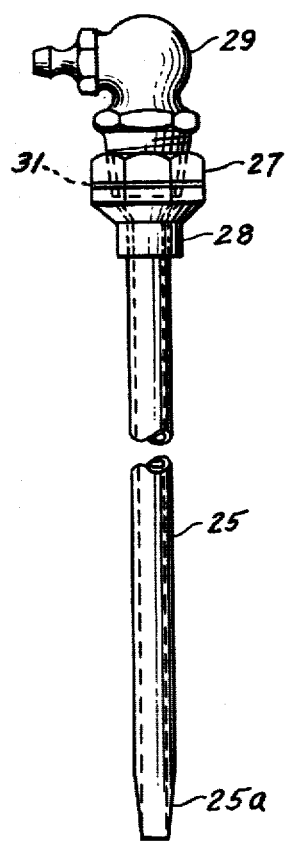
FIG. 3 is an enlarged view of the relubrication tube and fitting of the invention.
Figure 2:
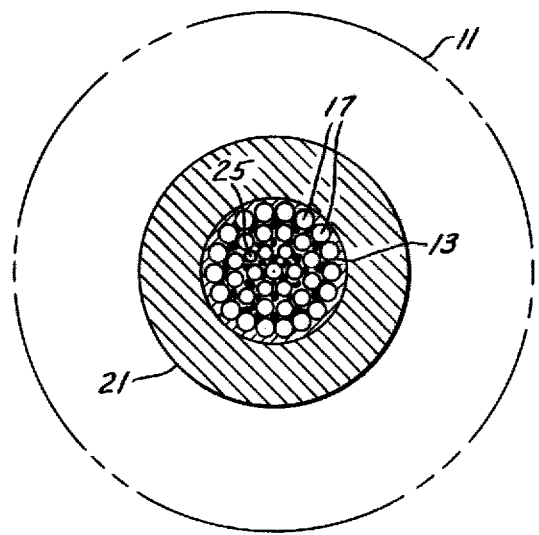
FIG. 2 is a cross section through the base of the poured socket attachment along line 2—2 in FIG. 1.

A thin seamless tube 25 extends down through the socketing metal 19 in the interstices between the individual wires and the end 25a of the tube extends substantially or slightly beyond the socket base and just beyond the point to where the hot metal extends. The top of the thin seamless tubing has a connector 27 attached to the end and a 90 degree pressure fitting 29 threaded into the end of the connector 27. The connector 27 and the pressure fitting 29 may conveniently be a so-called Alemite 90° Fitting and an Alemite-Tube Connector both of which may be purchased from the Alemite Division of the Stewart-Warner Corporation, 1826 Diversey Parkway, Chicago, Ill. 60614. The upper end of the tubing 25 is expanded in the manner of copper tubing within the connector 27 and the pressure fitting 29 when threaded into the connector serves to secure by jam-fitting the end of the tubing in the connector. This is shown more clearly in FIG. 3 where an expanded view partially in phantom of the tube and fitting is shown. Preferably the lower portion 25a of the tube is slightly tapered as shown in FIG. 3 particularly if the tube is not too thin. If the wires 17 of the strand 13 are very small the tube 25 will be even smaller and the end then may not require a taper. FIG. 2 shows how the thin lubrication tube 25 passes through the opening between adjacent larger diameter wires at the neck or base of the end fitting. The connector 27 preferably has a hexagonal or other polygonal section as shown and a horizontal groove 31 about the hexagonal section.

The hot metal socket 11 is applied to the end of the strand 13 in the normal manner by first preparing the strand end by cutting off at the proper length and then cleaning the portion which is to be socketed by dipping into a solvent, plus, if necessary, manual wiping or cleaning. The socket is then positioned over the end of the strand with the base of the socket disposed about the strand at the final desired position and the opening of the bowl of the socket disposed in an upright position to receive the socketing metal, or in the case of socketing with an organic resin, the liquid resin material. The cleaned portion of the strand will be substantially contained in the socket but a small portion should extend somewhat beyond the base of the socket to make sure that no grease or lubricant can seep back into the bowl of the socket and contact the hot metal or organic resin.

The ends of the wires 17 in the bowl 12 of the socket are broomed out to more or less evenly fill the bowl 12. The thin preferably seamless tubing 25 is next inserted down between the broomed out wires and between the unbroomed wires extending through the base of the socket. The tube 25 which preferably has a tapered end 25a to expedite insertion between the wires 17, particularly in the base of the socket, is inserted in the interstices between several adjacent wires as close to the center of the strand 13 as possible. Since the tube 25 is smaller than the component wires 17 of the strand it conveniently fits into the interstices or space between adjacent contacting wires as shown in FIG. 2. The lower end of the tube 25 extends preferably just beyond the base of the socket. The upper end of the tube which is fitted with a lubrication fitting 29 as described above is positioned just above the tops of the broomed out wires in the socket.

Molten spelter, or zinc alloy, or alternatively organic resin, 19 is next poured into the bowl 12 of the socket 11 until the broomed out wires are completely covered and the spelter or resin level surrounds the lower portion 28 of the fitting connector. Preferably the spelter or resin will also surround the hexagonal portion of the connector 27 and extend above the groove 31. The molten spelter or resin is then allowed to solidify without moving, or disturbing, the strand or socket. The molten spelter 19 material will partially flow or seep into the free, i.e. beyond the bowl of the socket, portion of the strand 13 through the base 21 of the socket but the amount of spelter at this point will not be sufficient to block the opening in the bottom of the tube 25. The same will be true if an organic resin socketing material is used.

After the molten spelter 19, or alternatively organic resin, is completely solidified, lubricant is pumped under pressure into the pressure fitting 29 at the top of the lubrication tube 25 and into the central portion of the strand adjacent to the base of the socket. Sufficient lubricant is applied to substantially completely fill this portion of the strand and may be continued if desired until lubricant appears at the surface of the strand. Thereafter the strand may be placed in service.

It is preferred to leave the pressure fitting 29 in the bowl 12 of the socket in place so that the strand may be relubricated periodically during service as necessary, particularly as the junction between the strand and the socket is, as explained above, a natural fatigue point. However, a single relubrication will be sufficient to bring the strand back to its original lubrication state and if periodic relubrication is not desired or deemed necessary the lubrication fitting can be removed. In such instance it may be desirable to then close off the upper end of the tube to prevent access of moisture or the like down the tube to the center of the strand. Normally, however, such access will be prevented by lubricant remaining in the tube.

It is preferable as shown in FIGS. 1 and 3 for the connector 27 to have a hexagonal or other polygonal cross section and to have a groove 31 in the lower portion of the hexagonal section, or else in the lower portion 28 of the connector. Alternatively, the groove 31 could be replaced by a ridge or by other protrusions on the surface of the connector. The level of the molten socketing spelter or fluid resin is, when the socket is being filled, brought to a level which surrounds the hexagonal portion of the connector 27 and is over the groove 31. The hexagonal or other polygonal shape of the connector after solidification of the spelter or resin prevents rotation of the connector and the parts connected to the connector. The spelter or resin in the groove 31 prevents the connector 27 and associated parts from pulling out of the solidified socketing liquid. It will be evident that vertical grooves or ridges or other protrusions or external interlocking means on the surface of the connector 27 could be substituted for the polygonal shape of the connector 27 to prevent rotation. Likewise, various external interlocking means including the groove 31, as shown, or a ridge or various other protrusions could be used to interlock the connector 27 with the solidified liquid socketing material and prevent withdrawal of the connector and associated structures from the socket. Interlocking protrusions which at the same time prevent both rotation and withdrawal of the connector and associated structures can be devised. External interlocking means could also be provided on the surface of the tube 25. The inventor has found the hexagonal or polygonal shape of the connector and the groove 31 in the connector to be particularly convenient and effective, however.

The result of the provision of the lubricant tube and lubrication of the portion of the strand adjacent to the end fitting by use of the tube is the provision of a particularly fatigue and corrosion resistant linear strand assembly with an improved working life.

In one example of the invention an open hot metal socket was applied to a 2¼ inch diameter wire strand by means of zinc spelter. After a 3/16 tube was inserted between the ¼ inch wires of the strand, approximately twenty (20) cubic centimeters of Lubriplate type lubricant was then injected through the tube. Very excellent and complete lubrication of the strand at the base of the socket was obtained. The Lubriplate lubricant was obtained from Filtration Incorporated, R.D. No. 1, Saylorsburg, Pa. 18353.

In a second example of the invention an open hot metal socket was applied to a 3½ inch diameter wire strand with zinc spelter after a 3/16 inch tube was inserted between the ¼ inch wires of the strand. Fifty (50) cubic centimeters of Lubriplate type wire lubricant was then injected through the tube into the central portion of the strand at the base of the socket. Very excellent and complete lubrication of the strand was obtained. Tests of the wire strand assembly showed complete lubrication of all the component wires of the strand.

The above description and examples have all been directed to the use of the lubrication tube 25 with a twisted or helical wire strand. However, it will be appreciated that the arrangement of the invention could equally well be used with a so-called parallel wire strand in which the individual wires of the strand are disposed in parallel rather than helical relationship with each other. As in a helical strand the lubricant tube will then be inserted in the interstices between adjacent contacting or substantially contacting wires of the strand.

The lubrication tube 25 has been described as "thin" in the description above. By thin it is meant that the outside diameter of the lubrication tube is smaller than at least two of the component wires of the strand immediately surrounding the tube and of a sufficiently reduced diameter to pass through the opening between contiguous contacting or substantially contacting wires of the strand.

The tube may thus pass through the interstice between two adjacent contacting wires which are larger than the tube, which adjacent wires are themselves in contact with at least one other wire which may, or may not, be larger than the tube. The above definition takes account of the fact that a strand may be formed from different sized wires. It will be evident that if the arrangement of the component wires is not to be disturbed by the tube, at the very least two adjacent wires must be larger than the tube in order to provide a large enough interstice between the wires for the tube to pass between such wires when they are in contact or substantially in contact. One or more wires will form the third side of the interstice. Normally all the wires immediately surrounding the tube will be larger than the tube itself. However, particularly where the strand is formed from layers, or operations, using different sized wires, the third side of the interstice may be formed from several smaller wires usually contained in a different layer, or operation, of wires from the larger wires.

It should also be pointed out that although for convenience the size of the lubrication tube with respect to the surrounding wires has been referred to above as the critical factor required to have the lubrication tube fit in the interstices between wires, the real factor or relationship which must be considered is the size of the tube in the region of the neck or base of the end fitting where the individual wires are closely held together in the same relative positions as they maintain in the strand immediately beyond. The positions of the wires in the bowl of the fitting are broomed out so that there is sufficient room for even very large lubrication tubes to fit between the wires. However, at the neck of the fitting the wires of the strand are closely compacted together. It is thus at the neck of the fitting where the tube diameter must in fact be less than that of adjacent wires. It will, therefore, be sufficient if the lubrication tube is tapered or otherwise reduced in diameter at the end of the tube in the portion where it extends into and through the neck of the fitting and just beyond into the free portion of the strand. For convenience a tapered or reduced diameter portion of a tube is considered to fall within the definition of a tube having a diameter, that is an outer diameter, less than that of adjacent wires, so long as the tapered or reduced portion has a lesser diameter than the adjacent wire.

While the present invention has been described and illustrated with respect to particular types of wire strand and with respect to particular types of lubricant injection tubes, it will be understood that the invention is broader and that any suitable tube could be used in many different types of strand socketed with various types of hot metal or organic resin sockets.

I claim:

1. A fatigue and corrosion resistant flexible linear assembly comprising:
   (a) a plurality of wires stranded together to form a flexible wire strand,
   (b) a poured socket attachment secured to an end of the wire strand by means of a solidified liquid contained in the bowl of the socket attachment,
   (c) a hollow tube having an external diameter less than the diameter of at least two adjacent individual wires comprising the wire strand, said hollow tube extending from the surface of the solidified liquid body within the bowl of the socket attachment, through the solidified liquid and in the interstice between the said two adjacent wires in substantial contact with each other and at least one other wire at the base of the socket attachment and exiting from the solidified liquid body at the base of the socket attachment near the center of the wire strand in a position such that a viscous fluid lubricant injected at the top of the hollow tube will be expelled from the lower end of the hollow tube into the center of the wire strand adjacent to the base of the socket fitting whereby the portion of the strand adjacent to the base of the socket attachment may be lubricated.

2. A fatigue and corrosion resistant flexible linear assembly according to claim 1 additionally comprising:
   (d) a lubricant fitting positioned at the top of the hollow tube.

3. A fatigue and corrosion resistant flexible linear assembly according to claim 2 additionally comprising:
   (e) a connector positioned between the top of the tube and the lubricant fitting.

4. A fatigue and corrosion resistant flexible linear assembly according to claim 3 additionally comprising:
   (f) external interlocking means on the surface of the connector adapted to interlock with the solidified liquid and prevent withdrawal of the connector from the bowl of the socket.

5. A fatigue and corrosion resistant flexible linear assembly according to claim 4 wherein the external interlock means is adapted to prevent rotation of the connector as well as withdrawal.

6. A fatigue and corrosion resistant flexible linear assembly according to claim 1 additionally comprising:
   (d) external interlocking means associated with the tube adapted to prevent its withdrawal from the solidified liquid.

7. A fatigue and corrosion resistant flexible linear assembly according to claim 1 in which the wire strand is a helical wire strand.

8. A fatigue and corrosion resistant flexible linear assembly according to claim 1 wherein the component wires of the strand are coated with a corrosion resistant metal.

9. A method of preventing working fatigue and failure in a wire strand having a poured socket type end fitting applied to the end of the strand comprising:
   (a) installing during socketing of the strand a thin lubricant tube having a diameter less than the diameter of at least two adjacent component wires of the strand in the interstices between said adjacent wires of the strand in a position such that the lubrication tube extends from the top surface of the poured liquid in the bowl of the end fitting, through the body of poured liquid and into the central portion of the wire strand adjacent to the base of the poured socket type end fitting, and
   (b) forcing lubricant through the lubricant tube into the central portion of the wire strand adjacent to the base of the end fitting after completion of socketing.

10. A method according to claim 8 additionally comprising:
    (c) periodically lubricating the strand through the lubrication tube during use of the strand.

* * * * *